United States Patent
Calciu et al.

(10) Patent No.: US 9,948,473 B2
(45) Date of Patent: Apr. 17, 2018

(54) SEAMLESS CONNECTION HANDSHAKE FOR A RELIABLE MULTICAST SESSION

(71) Applicant: LENOVO Enterprise Solutions (Singapore) PTE. LTD., New Tech Park (SG)

(72) Inventors: Corneliu-Ilie Calciu, Bucharest (RO); Radu Mihai Iorga, Bucharest (RO)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 143 days.

(21) Appl. No.: 14/613,905

(22) Filed: Feb. 4, 2015

(65) Prior Publication Data
US 2016/0226672 A1   Aug. 4, 2016

(51) Int. Cl.
*H04L 12/18* (2006.01)

(52) U.S. Cl.
CPC ........ *H04L 12/1863* (2013.01); *H04L 12/185* (2013.01); *H04L 12/1868* (2013.01)

(58) Field of Classification Search
CPC .................................................. H04L 12/1863
See application file for complete search history.

(56) References Cited

U.S. PATENT DOCUMENTS

| | | | |
|---|---|---|---|
| 6,775,707 B1 * | 8/2004 | Bennett | H04B 7/18593 370/395.4 |
| 2006/0120375 A1 * | 6/2006 | Ravikumar | H04L 29/12528 370/392 |
| 2008/0184276 A1 * | 7/2008 | Jong | H04L 63/0428 719/321 |
| 2009/0316811 A1 * | 12/2009 | Maeda | H04L 1/1671 375/260 |
| 2013/0147906 A1 * | 6/2013 | Weiser | H04L 12/1827 348/14.09 |
| 2013/0170425 A1 * | 7/2013 | Sung | H04W 4/08 370/312 |
| 2014/0078971 A1 * | 3/2014 | Bontu | H04W 8/005 370/329 |
| 2014/0082697 A1 * | 3/2014 | Watfa | H04W 76/025 726/3 |
| 2015/0127862 A1 * | 5/2015 | Fan | H04B 3/542 710/110 |

(Continued)

OTHER PUBLICATIONS

NACK-Oriented Reliable Multicast (NORM) Transport Protocol, Jan. 7, 2015, http://tools.ietf.org/html/rfc5740.

(Continued)

*Primary Examiner* — John Blanton
(74) *Attorney, Agent, or Firm* — Kunzler, PC.

(57) ABSTRACT

An apparatus, method, program product, and system are disclosed for seamless connection handshake for a reliable multicast session. A node module detects a new node attempting to join a multicast networking session. A handshake module generates a control packet comprising session initiation data for the new node. A packet module creates a combined data packet comprising the control packet and the multicast data packet and sends the combined data packet to the new node. The node module joins the new node to the ongoing multicast networking session without disturbing ongoing data transmissions during the multicast networking session.

16 Claims, 7 Drawing Sheets

(56) References Cited

U.S. PATENT DOCUMENTS

| | | | |
|---|---|---|---|
| 2015/0249515 A1* | 9/2015 | Wu ................... | H04L 12/2801 370/442 |
| 2016/0105377 A1* | 4/2016 | Nakagawa ........... | H04L 49/253 370/392 |
| 2016/0191357 A1* | 6/2016 | Orner ................ | H04L 43/0811 370/328 |
| 2016/0227471 A1* | 8/2016 | De Foy ............... | H04W 4/001 |

OTHER PUBLICATIONS

Multicast Negative-Acknowledgment (NACK) Building Blocks, Jan. 7, 2015, http://tools.ietf.org/html/rfc5401.

Zhonghai Lu, Bei Yin and Axel Jantsch—Connection-oriented Multicasting in Wormhole-switched Networks on Chip, Emerging VLSI Technologies and Architectures, 2006. IEEE Computer Society Annual Symposium.

* cited by examiner

SEAMLESS CONNECTION HANDSHAKE FOR A RELIABLE MULTICAST SESSION

FIELD

The subject matter disclosed herein relates to multicast networking and more particularly relates to connecting nodes to a reliable multicast networking session.

BACKGROUND

Description of the Related Art

Multicast is a form of group network communication where information is addressed to a group of destination nodes that are connected to the same multicast session. In general, multicast is a connectionless form of network communication, meaning that there may be no guarantee that data packets will be delivered successfully or in a predetermined order. Reliable multicast protocols may provide some solutions in terms of reliability for a multicast session; however, in order to synchronize new nodes connecting to the multicast group, or disconnect nodes that are leaving the multicast group, ongoing data transmissions to nodes in the multicast group may be paused or interrupted, which can be frustrating and inefficient.

BRIEF SUMMARY

An apparatus for seamless connection handshake for a reliable multicast session is disclosed. A method and computer program product also perform the functions of the apparatus. In one embodiment an apparatus includes a node module that detects a new node attempting to join a multicast networking session. In a further embodiment, the apparatus includes a handshake module that generates a control packet in response to detecting the new node. The control packet, in one embodiment, includes session initiation data associated with the multicast networking session.

In various embodiments, the apparatus includes a packet module that creates a combined data packet comprising the control packet and a subsequent multicast data packet sent during the multicast networking session. In one embodiment, the node module joins the new node to the multicast networking session, in response to the new node receiving the control packet, without disturbing ongoing data transmissions during the multicast networking session. In certain embodiments, one or more different nodes of the multicast networking session ignore the control packet of the combined data packet in response to receiving the combined data packet.

In some embodiments, the combined data packet is sent on the same multicast channel as other multicast data packets during the multicast networking session such that ongoing multicast data packet transmissions are not interrupted in response to the new node joining the multicast networking session. In one embodiment, the control packet is includes in a transport layer header of the combined data packet. In a further embodiment, the session initiation data includes a node identifier and a handshake bit.

In one embodiment, the apparatus includes a discard module that ignores a multicast data packet received at the new node in response to the new node not being joined to the multicast networking session. In certain embodiments, the apparatus includes an acknowledgement module that receives an acknowledgement message from the new node in response to the new node receiving the control packet. In various embodiments, the acknowledgement module is further configured to resend the combined data packet in response to not receiving an acknowledgement message from the new node within a predetermined threshold.

In some embodiments, the apparatus further includes a node removal module that removes the new node from the multicast networking session in response to the acknowledgement module resending the combined multicast data packet a predetermined number of times. In one embodiment, the predetermined threshold includes a time period that is a factor of a group round trip time. The group round trip time, in certain embodiments, includes a period of time for a multicast data packet to travel from a transmitting node to one or more receiver nodes of the multicast networking session and back to the transmitting node.

In one embodiment, the apparatus includes a termination module that sets a termination bit in the control packet, which may be combined with a subsequent multicast data packet. In some embodiments, the termination bit is set for a receiver node of the multicast networking session in response to the receiver node requesting to disconnect from the multicast networking session. In a further embodiment, the receiver node is disconnected from the multicast networking session in response to receiving the control packet with the termination bit set.

In one embodiment, the termination module is further configured to resend a the combined multicast packet, with the termination bit set, to the receiver node requesting to disconnect from the multicast networking session in response to receiving a negative acknowledgement (NACK) message from the receiver node. In some embodiments, the multicast networking session includes a broadcast networking session.

A method, in one embodiment, includes detecting, by use of a processor, a new node attempting to join a multicast networking session. In some embodiments, the method includes generating a control packet in response to detecting the new node. In some embodiments, the control packet includes session initiation data associated with the multicast networking session. The method, in one embodiment, includes creating a combined data packet comprising the control packet and a subsequent multicast data packet sent during the multicast networking session. In certain embodiments, the new node joins the multicast networking session, in response to receiving the control packet, without disturbing ongoing data transmissions during the multicast networking session.

In one embodiment, one or more different nodes of the multicast networking session ignore the control packet of the combined data packet in response to receiving the combined data packet. In some embodiments, the combined data packet is sent on the same multicast channel as other multicast data packets during the multicast networking session such that ongoing multicast data packet transmissions are not interrupted in response to the new node joining the multicast networking session. In a further embodiment, the method includes receiving an acknowledgement message from the new node in response to the new node receiving the control packet. The combined multicast data packet, in certain embodiments, is resent in response to not receiving an acknowledgement message from the new node within a predetermined threshold.

In one embodiment, the method includes removing the new node from the multicast networking session in response to resending the control packet a predetermined number of times. In various embodiments, the method includes setting a termination bit in the control packet, which may be combined with a subsequent multicast data packet. The termination bit, in some embodiments, is set for a receiver node of the multicast networking session in response to the receiver node requesting to disconnect from the multicast networking session. The receiver node, in one embodiment, disconnects from the multicast networking session in response to receiving the control packet with the termination bit set.

A program product, in one embodiment, includes a computer readable storage medium that stores code executable by a processor. In one embodiment, the executable code includes code for detecting a new node attempting to join a multicast networking session. In a further embodiment, the executable code includes code for generating a control packet in response to detecting the new node. In one embodiment, the control packet includes session initiation data associated with the multicast networking session. In some embodiments, the executable code includes code for creating a combined data packet comprising the control packet and a subsequent multicast data packet sent during the multicast networking session. In certain embodiments, the new node joins the multicast networking session, in response to receiving the control packet, without disturbing ongoing data transmissions during the multicast networking session.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
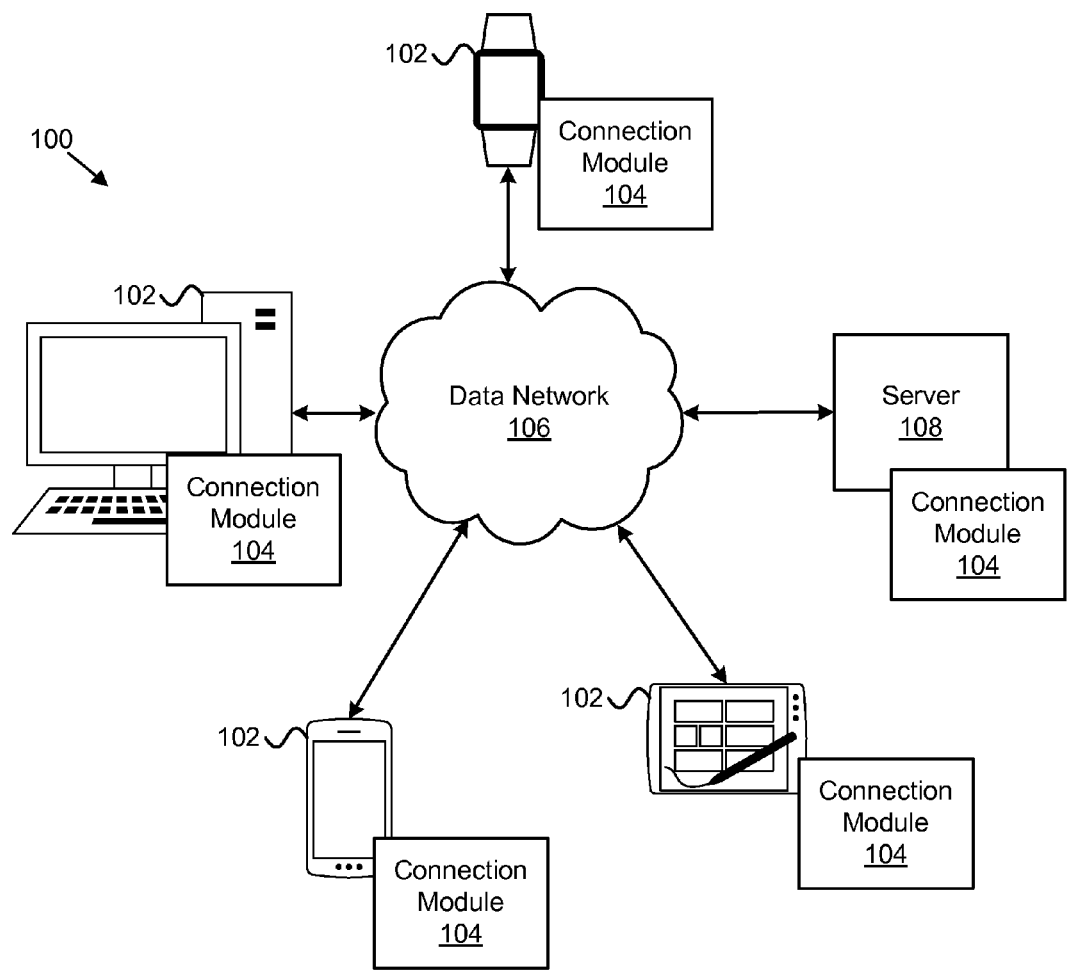
FIG. 1 is a schematic block diagram illustrating one embodiment of a system for seamless connection handshake for a reliable multicast session.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for seamless connection handshake for a reliable multicast session. In one embodiment, the system 100 includes information handling devices 102, connection modules 104, data networks 106, and servers 108. Even though a specific number of information handling devices 102, connection modules 104, data networks 106, and servers 108 are depicted in FIG. 1, one of skill in the art will recognize that any number of information handling devices 102, connection modules 104, data networks 106, and/or servers 108 may be included in the system 100.

In one embodiment, the information handling devices 102 include computing devices, such as desktop computers, laptop computers, personal digital assistants (PDAs), tablet computers, smart phones, smart televisions (e.g., televisions connected to the Internet), set-top boxes, game consoles, or the like. In some embodiments, the information handling devices 102 include wearable devices, such as smart watches, fitness bands, optical head-mounted displays, or the like. In certain embodiments, the information handling devices 102 include transmitter and/or receiver nodes in a multicast networking session or group.

As used herein, a multicast networking session may include a one-to-many, many-to-many, or the like, group communication configuration where information is addressed to a group of destination computers simultaneously. In certain embodiments, group communication may be application layer multicast, network assisted multicast, or the like. In network assisted multicast, it may be possible for a transmitter node to send data to a group of receiver nodes in a single transmission. In such an embodiment, copies of the data, or data packet, may be created automatically in other network elements, such as routers, switches, base stations, etc., but only to network segments that contain receiver nodes that are members of the multicast networking session. In one embodiment, the multicast networking session includes a broadcast networking session where the multicast data packets are received by every receiver node in the network, instead of only a subset of the receiver nodes that are members of a particular multicast networking session. Other multicast methods that may be used may include anycast, geocast, or the like.

In one embodiment, the multicast networking session includes a reliable multicast networking session. As used herein, a reliable multicast networking session may provide a reliable sequence of data packets to one or more receiver nodes in the multicast networking session, unlike traditional multicast networking sessions that may not guarantee delivery of data packets of a message stream. In some embodiments, to ensure reliable delivery of multicast data packets, the data packets may include additional information stored in headers of the multicast data packets, such as packet sequence numbers. The headers may be associated with networking protocols models, such as internet layer headers, transport layer headers, or the like, associated with the internet model (e.g., TCP/IP), the open systems interconnection (OSI) protocol stack, or the like.

In some reliable multicast systems, when a new receiver node attempts to join a reliable multicast networking session, a transmitter node may pause ongoing multicast data packet transmissions to establish a connection with the new node (e.g., a handshaking process). Alternatively, the transmitter node and the new receiver node may perform the handshaking process on a multicast transmission channel that is different than the multicast transmission channel used to send and receive multicast data packets for the multicast networking session. On the other hand, the connection module 104, in certain embodiments, establishes a reliable multicast connection between a transmitter node and a new node attempting to join an ongoing multicast networking session without disturbing ongoing multicast data transmissions and without using a separate channel to perform the handshaking process.

In one embodiment, the connection module 104 is configured to detect a new node attempting to join a multicast networking session and generate a control packet in response to detecting the new node. In certain embodiments, the control packet includes session initiation data associated with the multicast networking session. The connection module 104 may be further configured to create a combined data packet that includes the control packet and a subsequent data packet that is sent during the multicast networking session. In some embodiments, the connection module 104 connects the new node to the multicast networking session in response to the new node receiving the control packet without disturbing ongoing data transmissions during the multicast networking session.

The data network 106, in one embodiment, includes a digital communication network that transmits digital communications, such as multicast communication data packets. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the servers 108 include computing devices, such as desktop computers, laptop computers, mainframe computers, cloud servers, virtual servers, and/or the like. In some embodiments, the servers 108 are configured as application servers, email servers, database servers, file servers, game servers, home servers, media servers, web servers, and/or the like. In certain embodiments, the servers 108 are communicatively coupled to the information handling devices 102 via the data network 106 such that the information handling devices 102 may store and/or access data on the servers 108.

Figure 2:
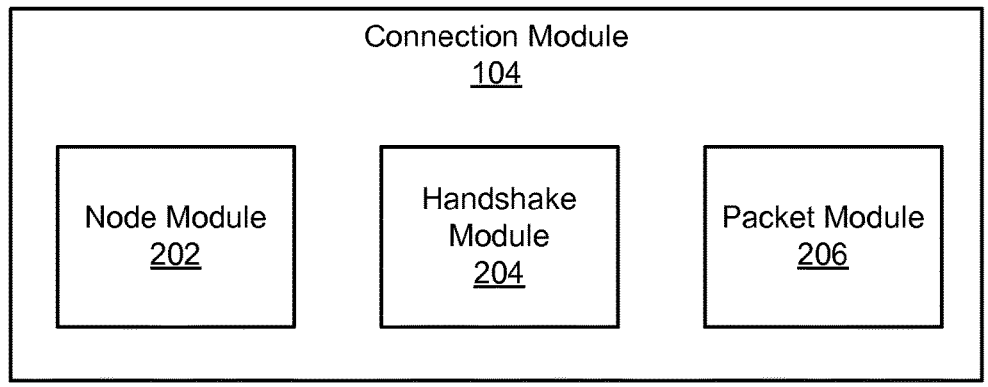
FIG. 2 is a schematic block diagram illustrating one embodiment of a module for seamless connection handshake for a reliable multicast session.

FIG. 2 depicts one embodiment of a module 200 for seamless connection handshake for a reliable multicast session. In one embodiment, the module 200 includes an embodiment of a connection module 104. The connection module 104, in certain embodiments, includes a node module 202, a handshake module 204, and a packet module 206, which are described in more detail below.

In one embodiment, the node module 202 is configured to detect a new node attempting to join a multicast networking session. In certain embodiments, membership in a multicast networking session is dynamic, meaning that member nodes may join and leave a multicast session at any time. In a reliable multicast network, however, before new nodes may join a group, the new node is synchronized with the other nodes of a multicast session by sharing connection establishment data (e.g., IP addresses, MAC addresses, session IDs, network protocol information, or the like). Thus, the node module 202, for example, may receive a message, notification, alert, or the like, indicating that a new node is attempting to join the group of member nodes of a reliable multicast networking session. In some embodiments, the node module 202 may poll for new nodes that are attempting to join an ongoing multicast networking session.

In one embodiment, the node module 202 is configured to determine, find, locate, or the like, one or more new receiver nodes to connect to the multicast networking session. In certain embodiments, the node module 202 determines a number of new nodes to connect to the multicast session based on the resource needs of a control plane (i.e., the part of the multicast network that carries signaling traffic and is responsible for routing), a management plane (i.e., the part of the multicast network that carries administrative traffic for the network), an application, or the like. For example, the node module 202 may be located on a central node in a multicast network as part of a datacenter distributed switch fabric. The node module 202 may determine which nodes to join or remove to/from the multicast networking session based on the needs of the nodes, applications, network components, or the like, of the multicast network.

The handshake module 204, in one embodiment, is configured to generate a control packet in response to detecting or determining the new node attempting to connect to the multicast networking session. In one embodiment, the control packet includes session initiation data associated with the multicast networking session. In one embodiment, session initiation data includes one or more data fields, including a handshake flag or bit and a node identifier. The handshake bit may indicate that the control packet includes connection establishment information intended for the new node with the given node identifier. In certain embodiments, the node identifier is determined or assigned by the node module 202. In certain embodiments, the control packet may include other connection information, such as network protocol data, addressing information (e.g., MAC addresses), or the like.

The packet module 206, in one embodiment, is configured to create a combined data packet comprising the control packet generated by the handshake module 204 and a subsequent multicast data packet that is sent to one or more receiver nodes of the multicast networking session. In response to receiving the combined data packet, the node module 202 may join the new node to the multicast networking session without disturbing, interrupting, pausing, or the like, ongoing data transmissions during the multicast networking session.

For example, a multicast networking session may include a transmitter node and two receiver nodes. The transmitter node may send a multicast data packet with sequence number x. Thereafter, the node module 202 may detect that a new receiver node, node n+1, is attempting to join the multicast networking session. The handshake module 204 may generate a control packet with the handshake bit set to 1 and the node identifier set to n+1. The packet module 206 may combine the control packet with the next multicast data packet before the multicast data packet is sent to the receiver nodes.

When a receiver node that is not the new receiver node receives the combined data packet, the receiver node may ignore the control packet information (because the node identifier does not match the identifier of the receiver node, for example), and receives or copies the data or payload of the multicast data packet. On the other hand, when the new receiver node receives the combined data packet, the new receiver node may determine that the node identifier, n+1, matches its identifier indicating that the control packet is intended for it. The new receiver node may then receive/copy the payload data of the multicast data packet while simultaneously joining the multicast networking session in response to the handshake bit being set in the control packet. In some embodiments, the new receiver node is joined to the multicast networking session in response to sending an acknowledgement ("ACK") message to the transmitter node, on a unicast channel, for example, indicating that the control packet was received successfully. In this manner, the connection module 104 establishes a connection to a new receiver node for a multicast networking session without interrupting or pausing ongoing data transmissions between a transmitter node and one or more receiver nodes.

In some embodiments, the packet module 206 holds the control packet in a queue until the next multicast data packet is ready to be sent to one or more receiver nodes. For example, if the node module 202 detects a new receiver node attempting to join the multicast networking session, but there are no multicast data packets currently being transmitted, the packet module 206 may place the control packet for the new receiver node in a queue until a new multicast data packet is ready to be sent.

In various embodiments, the packet module 206 sends the combined data packet on the same multicast channel as one or more different multicast data packets during the multicast networking session. For example, if the multicast networking session is being held on IP address 224.1.1.1, meaning multicast data packets are being sent from a transmitting node to the receiver nodes using the IP address 224.1.1.1, the combined data packet is also sent and received on IP address 224.1.1.1 instead of a different IP address. Because the combined data packet is sent on the same multicast channel as other multicast data packets, the ongoing data packet transmissions are not interrupted or paused in response to the new node joining the multicast networking session.

In some embodiments, the packet module 206 combines the control packet with the multicast data packet by placing the control packet in a transport layer header for the multicast data packet. As used herein, a transport layer header may be a networking layer that provides end-to-end or host-to-host communication services for applications within a layered architecture of network components and protocols. The transport layer header may include information to provide reliable data packet delivery such as sequence numbers or other error correction information.

For example, a multicast data packet may include a transport layer header that includes a sequence number for the packet, such as sequence number 1. Thereafter, if a receiver node receives a subsequent multicast data packet that includes sequence number 3 in the transport layer header, the receiver node may determine that multicast data packet with sequence number 2 was not delivered successfully to the receiver node. In such an embodiment, the receiver node may send a negative acknowledgement ("NACK") message with sequence number 2 to the transmitter node to signal the transmitter node to resend the multicast data packet with sequence number 2. As used herein, a NACK includes a message that is sent to negatively acknowledge or reject a previously received message, or to indicate some kind of error, as opposed to a positive acknowledgement ("ACK") message to acknowledge receipt of a message. For example, as described above, instead of sending an ACK message after each multicast data packet is received by a receiver node, the receiver node may only send a NACK message when the receiver node detects a missing packet. In this manner, the multicast networking session is a reliable multicast networking session.

In certain embodiments, the transport layer header sits below an application layer header, which specifies the shared protocols and interface methods used by hosts in a communications network. The transport layer header may also sit above an internet layer header, which may include a group of internetworking methods, protocols, and specifications in the internet protocol suite that are used to transport datagrams (e.g., packets) from the originating host across network boundaries, if necessary, to the destination host specified by a network address (e.g., an IP address). For example, an internet layer header may include data for the Internet Group Management Protocol (IGMP), which is a communications protocol used by hosts and adjacent routers on IP networks to establish multicast group memberships. The internet layer header may sit above a link layer header, which may include a group of methods and communications protocols that only operate on the link that a host is physically connected to.

Figure 3:
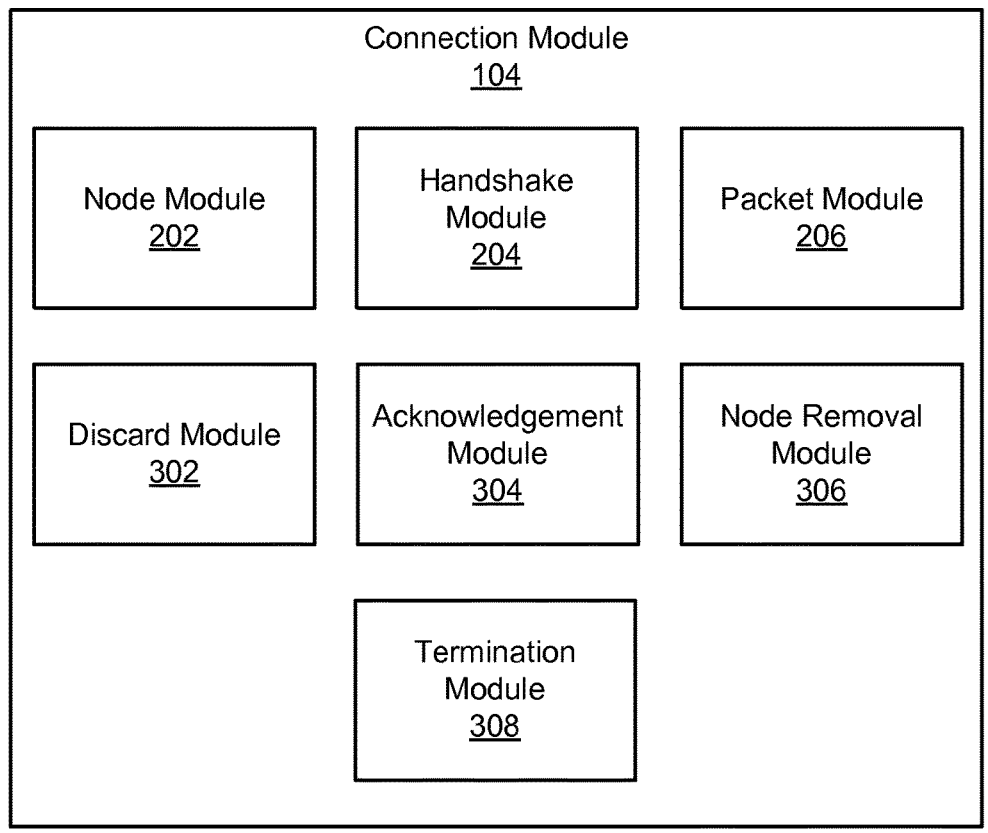
FIG. 3 is a schematic block diagram illustrating one embodiment of another module for seamless connection handshake for a reliable multicast session.

FIG. 3 depicts one embodiment of another module 300 for seamless connection handshake for a reliable multicast session. In one embodiment, the module 300 includes an embodiment of a connection module 104. The connection module 104, in certain embodiments, includes a node module 202, a handshake module 204, and a packet module 206, which may be substantially similar to the node module 202, the handshake module 204, and the packet module 206 described above with reference to FIG. 2. Further, the connection module 104 of FIG. 3, in various embodiments, may include one or more of a discard module 302, an acknowledgement module 304, a node removal module 306, and a termination module 308, which are described in more detail below.

In one embodiment, the discard module 302 is configured to ignore a multicast data packet received at the new node in response to the new node not being joined to the multicast networking session. In some embodiments, if a new node attempts to join a multicast networking session on a particular multicast channel, the new node may receive one or more multicast data packets before it has joined the multicast networking session, e.g., before the new node receives a control packet with a set handshake bit. The discard module 302, before the new node joins the multicast session, may check a received multicast data packet to determine whether the packet contains a control packet with session initiation information, e.g., a handshake bit and a node identifier. If not, in such an embodiment, the discard module 302 ignores payload data contained in the received multicast data packet until the new node receives a combined multicast data packet with the handshake bit set.

In one embodiment, the acknowledgement module 304 is configured to receive an acknowledgement message from the new node in response to the new node receiving the control packet. As described above, in certain embodiments, the new node is not joined to the group of members of the multicast networking session until the transmitter node, e.g., the acknowledgement module 304, receives a positive acknowledgement ("ACK") signal from the new node indicating that the handshake data was received successfully.

In certain embodiments, if the combined data packet is not received successfully, e.g., if the transmitter node does not receive an ACK signal from the new node, the acknowledgement module 304 is further configured to resend the control packet with the multicast data packet, i.e., the original combined multicast data packet. In some embodiments, the acknowledgement module 304 resends the combined data packet if an ACK signal is not received within a predetermined threshold, such as within a predetermined period of time, within a number of multicast data packets being sent, or the like. In such an embodiment, the new node may continue to receive and process multicast data packets, even though an ACK signal has not been sent by the new node or received by the acknowledgement module 304, until a predetermined threshold is satisfied, has expired, or the like.

For example, the acknowledgement module 304 may resend the combined data packet ten times until an ACK message is received from the new node. In another example, the acknowledgement module 304 may resend the combined data packet until an ACK message is received or until the expiration of a predetermined time period, such as 5 seconds, 1 second, 500 milliseconds, or the like. In certain embodiments, the predetermined time period is determined based on a factor of a group round trip time, such as two or three times the group round trip time for the multicast networking session. As used herein, the group round trip time may include the period of time it takes for a multicast data packet to travel from a transmitting node to one or more receiver nodes of the multicast networking session and back to the transmitting node.

If an ACK message is not received after the threshold multicast data packet is sent (e.g., after the tenth combined data packet is sent as described in the previous example), or the threshold period of time is met or exceeded, the node removal module 306 removes the new node from the multicast networking session. For example, if the threshold includes ten multicast data packets and the acknowledgement module 304 does not receive an ACK signal before or in response to a control packet being sent with the tenth multicast data packet, the node removal module 306 may remove the new node from the multicast networking session.

The node removal module 306, in some embodiments, may remove a new node from the multicast session by not sending any multicast data transmission to the new node. For example, the node removal module 306 may track, store, or otherwise record an identifier associated with the new node, such as the new node's IP address, MAC address, or other identifying information such that the transmitter node can determine whether the new node has been "blacklisted," blocked, or otherwise removed from the multicast networking session. In certain embodiments, the node removal module 306 closes a connection with the new node to remove the new node from the multicast networking session. If the node removal module 306 has removed the new node from the multicast networking session, the transmitter node does not send any multicast data packets to the new node.

In some embodiments, the node removal module 306 associates a connection flag with the new node, which may indicate a connection state for the new node, such as attempting to connect, reject connection, allow connection, or the like. For example, the node module 202 may set the connection flag to an attempting to connect state in response to detecting the new node is attempting to connect to the multicast data session. In one embodiment, the node removal module 306 removes the new node from the multicast session by setting the connection flag for the new node to a connection reject state, a connection ignore state, or the like. For example, a transmitter node may check the connection flag associated with the new node before sending any multicast data packets to the new node. If the connection flag is set in a reject connection state, the transmitter node may not send any multicast data packets to the new node.

In certain embodiments, the node removal module 306 permanently or temporarily removes a node from the multicast networking session. For example, if the node removal module 306 permanently removes a node from the multicast networking session, the removed node will never be able to join the group associated with the multicast networking session. On the other hand, if the node removal module 306 temporarily removes a node from the multicast networking session, the node may be able to rejoin the multicast session group after the expiration of a predetermined period of time, such as a predetermined number of minutes, hours, days, or the like, after a predetermined number of multicast packets have been sent, in response to resetting the connection flag to an allow connection state, or the like.

In one embodiment, the termination module 308 is configured to set a termination bit, flag, field, or the like, in a control packet, e.g., in the transport layer header of a multicast data packet, to indicate the end of a session for one or more of the multicast networking session nodes. In certain embodiments, the termination bit is set for a receiver node of the multicast networking session in response to the receiver node requesting to disconnect from the multicast networking session or in response to a central node of the multicast session removing the node from the multicast networking session. In response to receiving the termination bit, in certain embodiments, the receiver node ends its connection to the multicast networking session.

Similar to the handshaking process described above, the termination module 308 disconnects a node from the multicast networking session by setting a termination bit in a control packet and combining the control packet with a multicast data packet (e.g., by placing the control packet in the transport layer header of the multicast data packet), without disturbing, interrupting, pausing, or the like, ongoing data transmissions during the multicast networking session. In some embodiments, if the disconnecting node receives one or more subsequent multicast data packets after receiving the packet with the termination bit set, the disconnecting node ignores, discards, or the like, data contained in the received multicast data packets.

In a further embodiment, the termination module 308 receives a negative acknowledgement ("NACK") signal from the disconnecting node indicating an error or other problem with the disconnection process. For example, if a disconnecting node indicates that it is disconnecting from the multicast session, but does not receive a control packet with the termination bit set within a predetermined period of time after indicating its intention to leave the multicast networking session, the termination module 308 may receive a NACK signal from the disconnecting node. In response to receiving the NACK signal, the termination module 308 may be configured to resend the combined multicast data packet, with the termination bit set, to the disconnecting node.

Figure 4A:
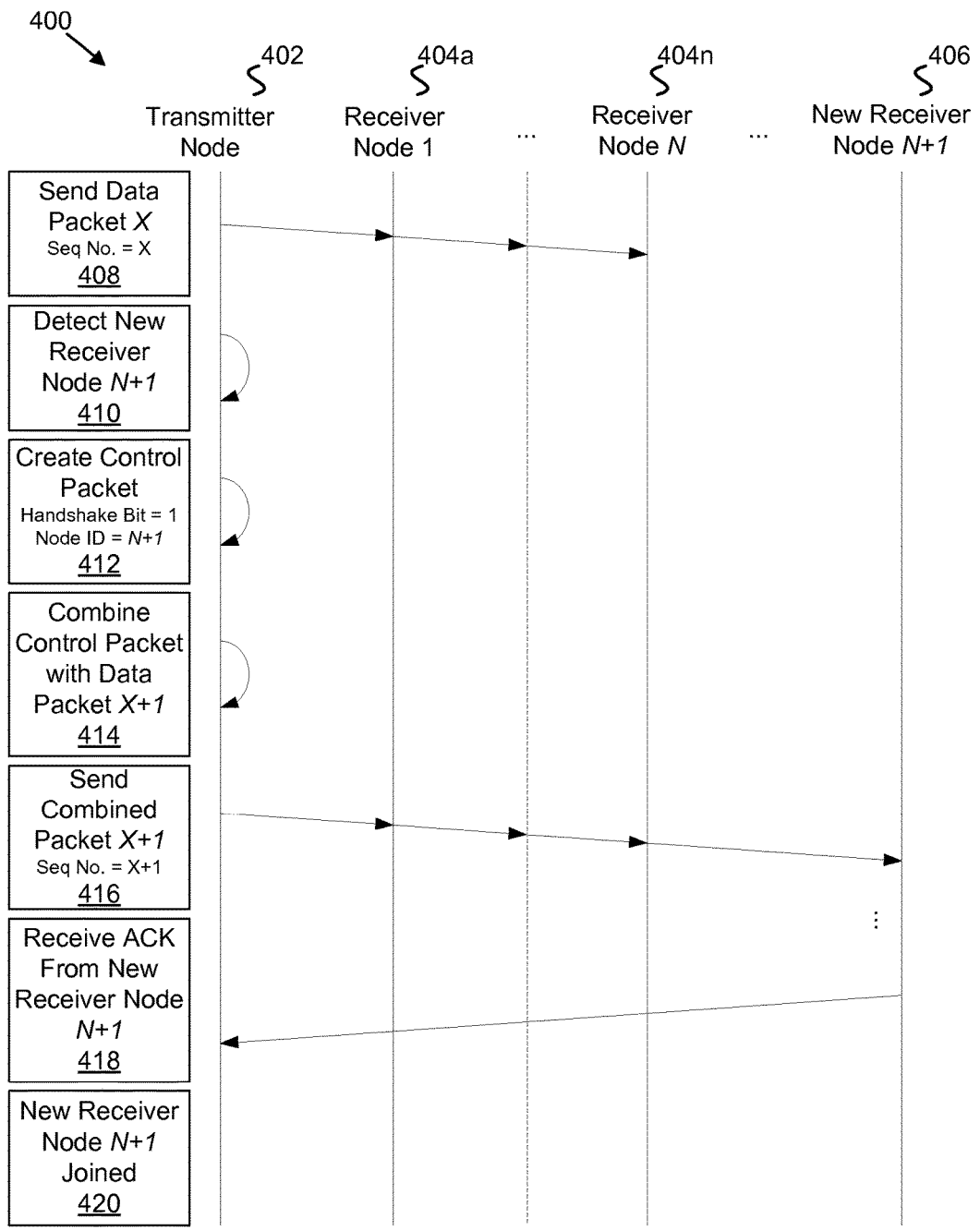
FIG. 4A is a schematic block diagram illustrating one embodiment of a seamless connection handshake for a reliable multicast session.

FIG. 4A depicts one embodiment 400 of a seamless connection handshake for a reliable multicast session. In one embodiment, the reliable multicast session includes a transmitter node 402, one or more receiver nodes 404a-n that are currently connected to the multicast networking session, and a new receiver node 406. Before the new receiver node 406 attempts to join the ongoing multicast networking session, the transmitter node may send 408 a multicast data packet X, with sequence number x, to the receiver nodes 404a-n in the multicast group. Thereafter, the node module 202 may detect 410 that a new receiver node 406 is attempting to join the ongoing multicast networking session. In one embodiment, the node module 202 detects that a new receiver node 406 is attempting to join an ongoing multicast networking session in response to the node module 202 sending a command, notification, message, or the like to the new receiver node 406 to signal the new receiver node 406 to connect to the multicast networking session.

In response to the node module 202 detecting the new receiver node 406, the handshake module 204 may create 412 a control packet intended for the new receiver node 406 that includes a handshake bit, set to 1 (or true, etc.), and an identifier, N+1, for the new receiver node 406 that indicates that the control packet is intended for the new receiver node 406 and not a different receiver node 404a-n. The packet module 206, in one embodiment, combines 414 the control packet with a subsequent multicast data packet, X+1, and sends 416 the combined data packet, X+1, with sequence number x+1, to the receiver nodes 404a-n and the new receiver node 406.

When a receiver node 404a-n that is already a member of the multicast group receives the combined data packet, the receiver nodes 404a-n may process the payload data of the of the combined data packet and ignore the control packet because the node identifier set in the control packet does not match the node identifiers for any of the existing receiver nodes 404a-n. The new receiver node 406, on the other hand, may receive the combined data packet and process the payload of the combined data packet while also continuing the handshaking process in response to determining that the node identifier in the control packet matches the node identifier of the new receiver node 406 and the handshake bit is set to 1 in the control packet. In certain embodiments, the new receiver node 406 returns a positive acknowledgement ("ACK") signal to the transmitter node 402, which may be received 418 by the acknowledgement module 304. In response to receiving the ACK signal from the new receiver node 406, the node module 202 joins 420 the new receiver node 406 to the multicast networking session without disturbing, interrupting, pausing, or otherwise interfering with the ongoing data transmissions during the multicast networking session.

Figure 4B:
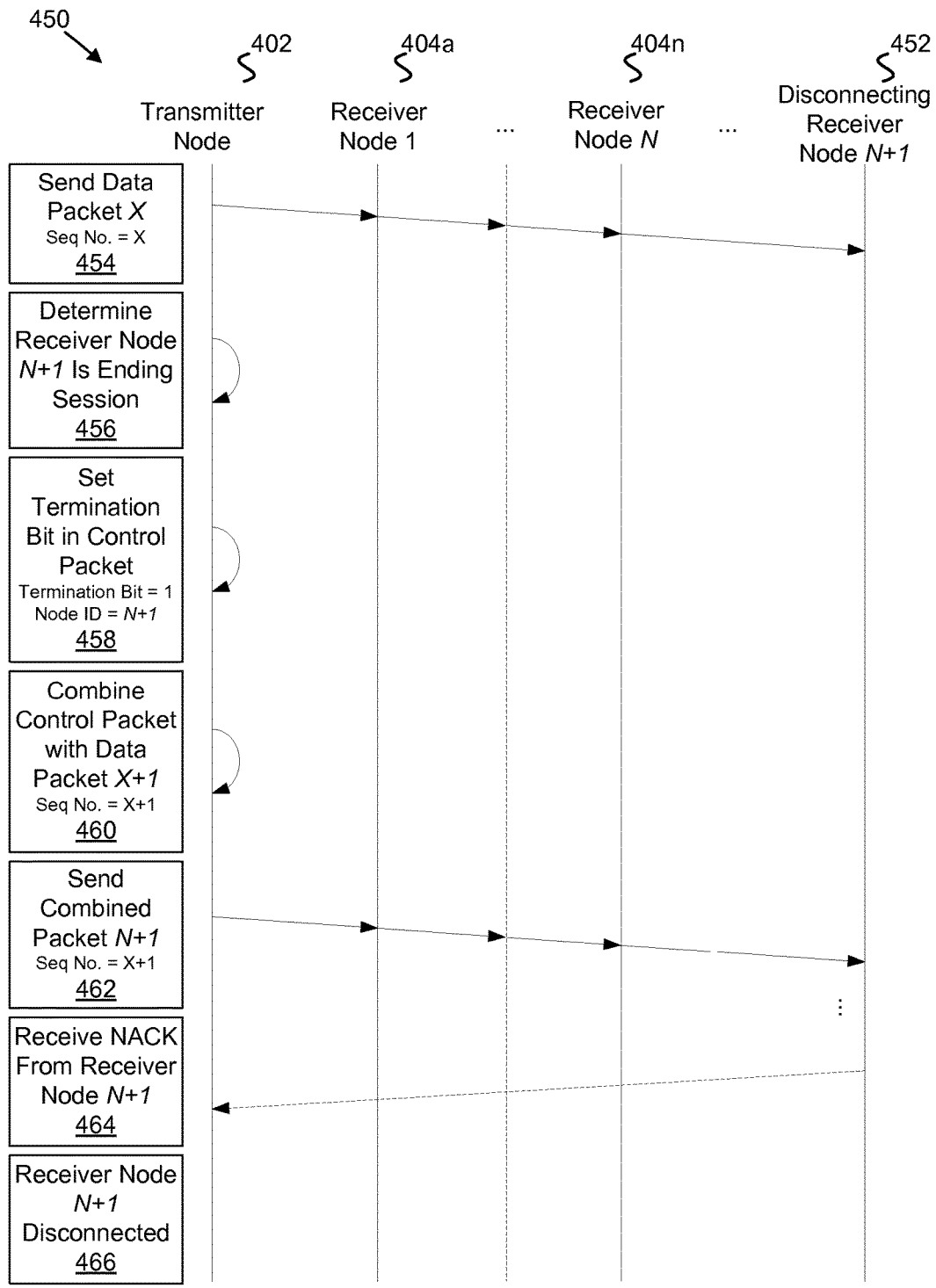
FIG. 4B is a schematic block diagram illustrating one embodiment of terminating a multicast networking session.

FIG. 4B depicts one embodiment 450 of terminating a multicast networking session. In one embodiment, the multicast networking session includes a transmitter node 402, one or more receiver nodes 404a-n, and a disconnecting node 452. Before the disconnecting node 452 indicates that it is ending its connection to the multicast networking session, or before the node module 202 signals the disconnecting node 452 to disconnect from the multicast networking session, the transmitter node 402 sends 454 multicast data packets to each receiver node 404a-n, 452 of the multicast networking session. At some point thereafter, the termination module 308 may determine 456 that a receiver node 452 is ending its connection to the multicast networking session.

The termination module 308, in response to determining which receiver node 452 is disconnecting, may set 458 a termination bit to 1, or true, in a control packet and may set the node identifier to N+1 to indicate that the control packet is intended for the disconnecting node with the identifier N+1. The termination module 308, or the packet module 206, may combine 460 the control packet with a subsequent data packet and send 462 the combined data packet to the receiver nodes 404a-n, 452 of the multicast networking session.

When a receiver node 404a-n that is not the disconnecting receiver node 452 receives the combined data packet, the receiver nodes 404a-n may process the payload data of the of the combined data packet and ignore the control packet because the node identifier set in the control packet does not match the node identifiers for any of the receiver nodes 404a-n. The disconnecting receiver node 452, on the other hand, may receive the combined data packet and process, or ignore, the payload of the combined data packet while also disconnecting from the multicast networking session in response to determining that the node identifier in the control packet matches the node identifier of the disconnecting receiver node 452 and that the termination bit is set to 1 in the control packet.

In some embodiments, if the disconnecting node 452 fails to receive a control packet with a termination bit set, or if a different problem occurs with the disconnecting node 452 disconnecting from the multicast networking session, the disconnecting node 452 may send a negative acknowledgement ("NACK") signal, which may be received 464 by the termination module 308. In response to receiving the NACK signal, the termination module 308 may resend the combined data packet, with the termination bit set. If no response is received from the disconnecting node 452 for a threshold period of time, the disconnecting node 452 is disconnected 466 form the multicast networking session and will not receive any subsequent multicast data transmissions from the transmitter 402.

Figure 5:
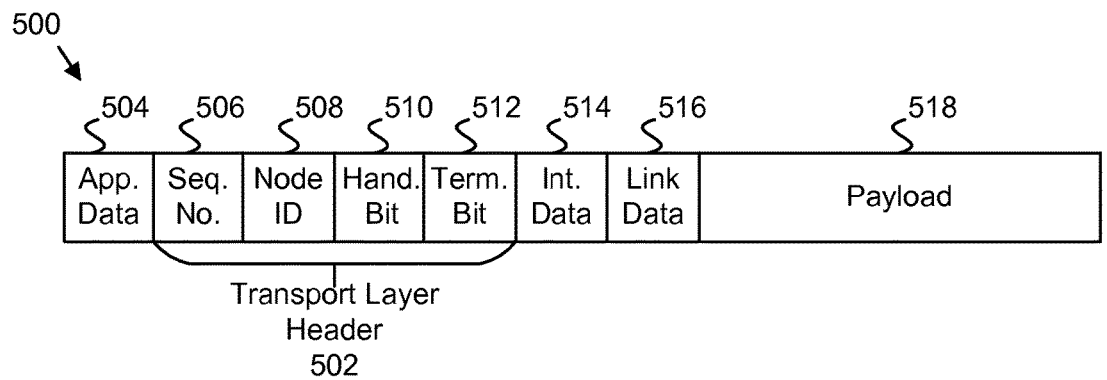
FIG. 5 is a schematic block diagram illustrating one embodiment of a multicast networking packet.

FIG. 5 depicts one embodiment of a multicast networking packet 500. In one embodiment, the multicast data packet 500 includes a combined data packet described above. The multicast data packet 500, in certain embodiments, includes a transport layer header 502 comprising the elements of a control packet created by the handshake module 204. For example, the control packet may include a packet sequence number 506, a receiver node identifier 508, a handshake bit/field 510, and a termination bit 512. Other fields not shown may be included in the transport layer header 502, such as addressing data, or other connection or protocol data. As described above, the handshake bit 510 is set to join new receiver nodes with the specified node ID 508. Further, the termination bit 512 is set to disconnect a receiver node with the specified node ID 508 from that multicast networking session. The multicast data packet 500 may also include application layer data 504, internet layer data 514, link or physical layer data 516, and payload data 518.

In an embodiment where a new receiver node is attempting to join a multicast networking session, a receiver node may check the data in the transport layer header 502, in particular the handshake bit 510 and the node ID 508, to determine if the data in the transport layer header is intended for it. If not, the receiver node processes the payload data 518 while ignoring the data in the transport layer header 502. On the other hand, the new receiver node with the same node ID as the node ID 508 specified in the transport layer header 502 will process the payload data 518 while also processing the data in the transport layer header 502. In other words, if the new receiver node determines that the handshake bit 510 is set, the new receiver node will continue with the handshaking process, e.g., by sending an ACK message in response to receiving the multicast data packet 500.

In an embodiment where a receiver node is disconnecting from a multicast networking session, the receiver node may check the data in the transport layer header 502, in particular the termination bit 512 and the node ID 508, to determine if the data in the transport layer header is intended for it. If not, the receiver node processes the payload data 518 while ignoring the data in the transport layer header 502. On the other hand, the disconnecting receiver node with the same node ID as the node ID 508 specified in the transport layer header 502 will close its connection to the multicast networking session, while processing or ignoring the payload data 518, in response to the termination bit being set.

Figure 6:
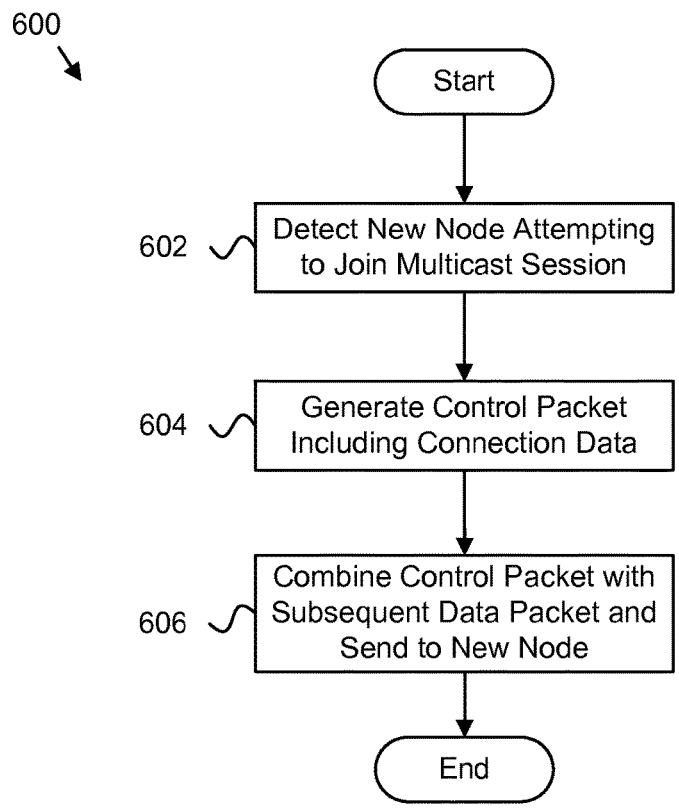
FIG. 6 is a schematic flow chart diagram illustrating one embodiment of a method for seamless connection handshake for a reliable multicast session.

FIG. 6 depicts one embodiment of a method 600 for seamless connection handshake for a reliable multicast session. In one embodiment, the method 600 begins and detects 602 a new node attempting to join a multicast networking session. In one embodiment, the node module 202 detects 602 a new node attempting to join a multicast networking session. The method 600, in some embodiments, generates 604 a control packet in response to detecting the new node. The handshake module 204 may generate 604 a control packet, in one embodiment. In some embodiments, the control packet includes session initiation data associated with the multicast networking session. In one embodiment, the method 600 creates 606 a combined data packet including the control packet and a subsequent multicast data packet sent during the multicast networking session, and the method 600 ends. For example, the packet module 206 may create a combined data packet. In some embodiments, the node module 202 joins the new node to the multicast networking session, in response to receiving the control packet, without disturbing ongoing data transmissions during the multicast networking session.

Figure 7:
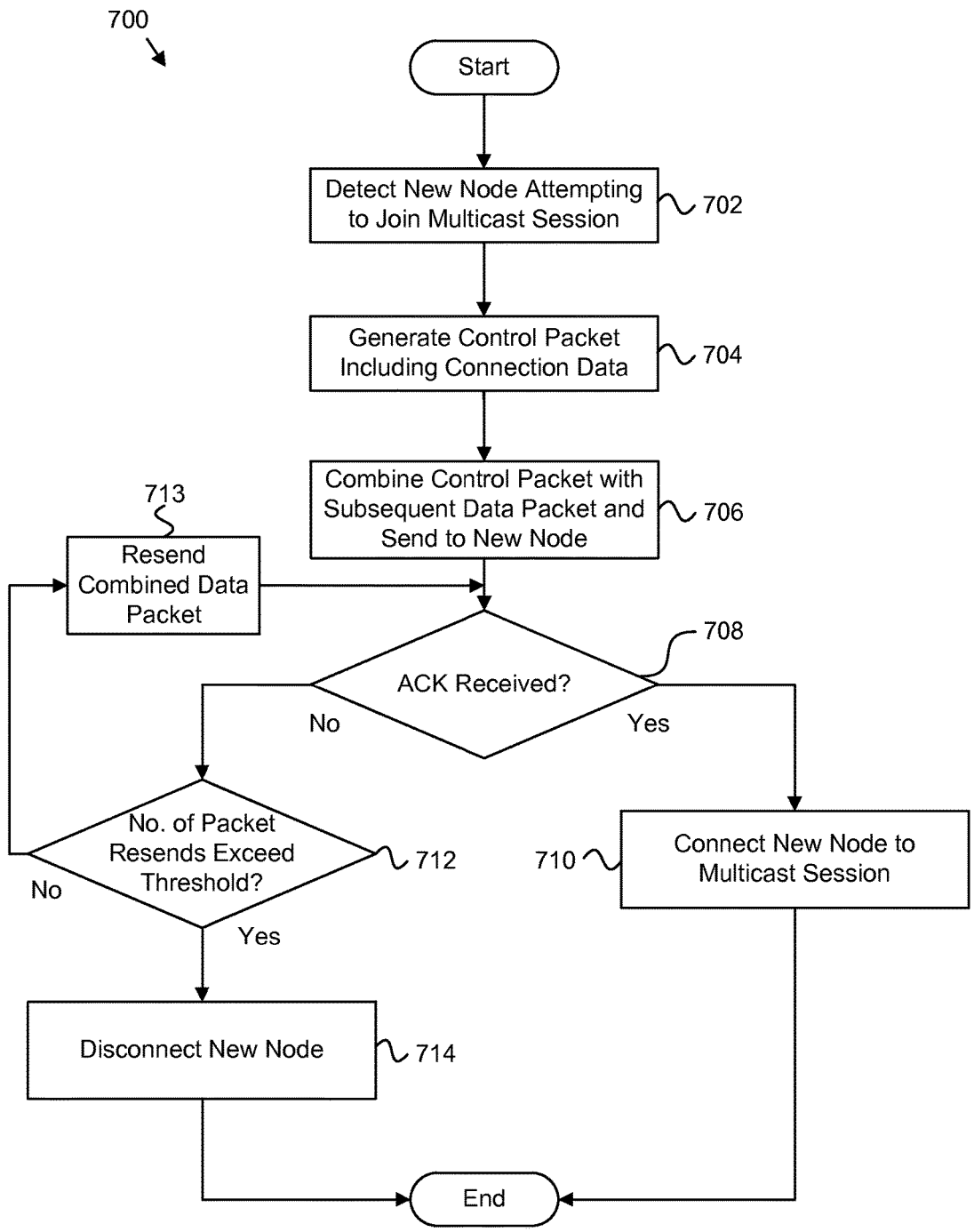
FIG. 7 is a schematic flow chart diagram illustrating one embodiment of another method for seamless connection handshake for a reliable multicast session.

FIG. 7 depicts one embodiment of another method 700 for seamless connection handshake for a reliable multicast session. In one embodiment, the method 700 begins and detects 702 a new node attempting to join a multicast networking session. For example, the node module 202 may detect 702 a new node attempting to join a multicast networking session. The method 700, in some embodiments, generates 704 a control packet in response to detecting the new node. In one embodiment, the handshake module 204 generates 704 a control packet. In some embodiments, the control packet includes session initiation data associated with the multicast networking session. In one embodiment, the method 700 creates 706 a combined data packet including the control packet and a subsequent multicast data packet sent during the multicast networking session. The packet module 206 may create 706 a combined data packet in one embodiment. In some embodiments, the node module 202 joins the new node to the multicast networking session, in response to receiving the control packet, without disturbing ongoing data transmissions during the multicast networking session.

In a further embodiment, the method 700 determines 708 whether an ACK signal was received from the new receiver node. If not, the method 700 may determine 712 whether the number of times the control packet has been resent satisfies a predetermined resend threshold, which may include a period of time or a number of subsequent multicast data transmissions. For example, the acknowledgement module 304 may determine 708 whether an ACK signal was received or may determine 712 whether the number of times the control packet has been resent satisfies a predetermined resend threshold. If the method 700 determines 712 that the resend threshold has not been satisfied, the method 700 resends 713 the combined data packet. For example, the acknowledgement module 304 or the packet module 206 may resend 713 the combined data packet. On the other hand, if the method 700 determines 712 that the resend threshold has been satisfied, the method 700 may remove or disconnect 714 the new receiver node from the multicast networking session, and the method 700 ends. In one embodiment, the node removal module 306 removes or disconnects 714 the new receiver node from the multicast networking session.

In some embodiments, if the method 700 determines 708 that an ACK signal has been received from the new receiver node in response to the new receiver node receiving the control packet, the method 700 may connect 710 the new receiver node to the multicast networking session, and the method 700 ends. The node module 202 may connect 710 the new receiver node to the multicast networking session. In this manner, the new receiver node may be connected or joined to an ongoing multicast networking session without disturbing, pausing, or other interrupting ongoing multicast data transmissions.

Figure 8:
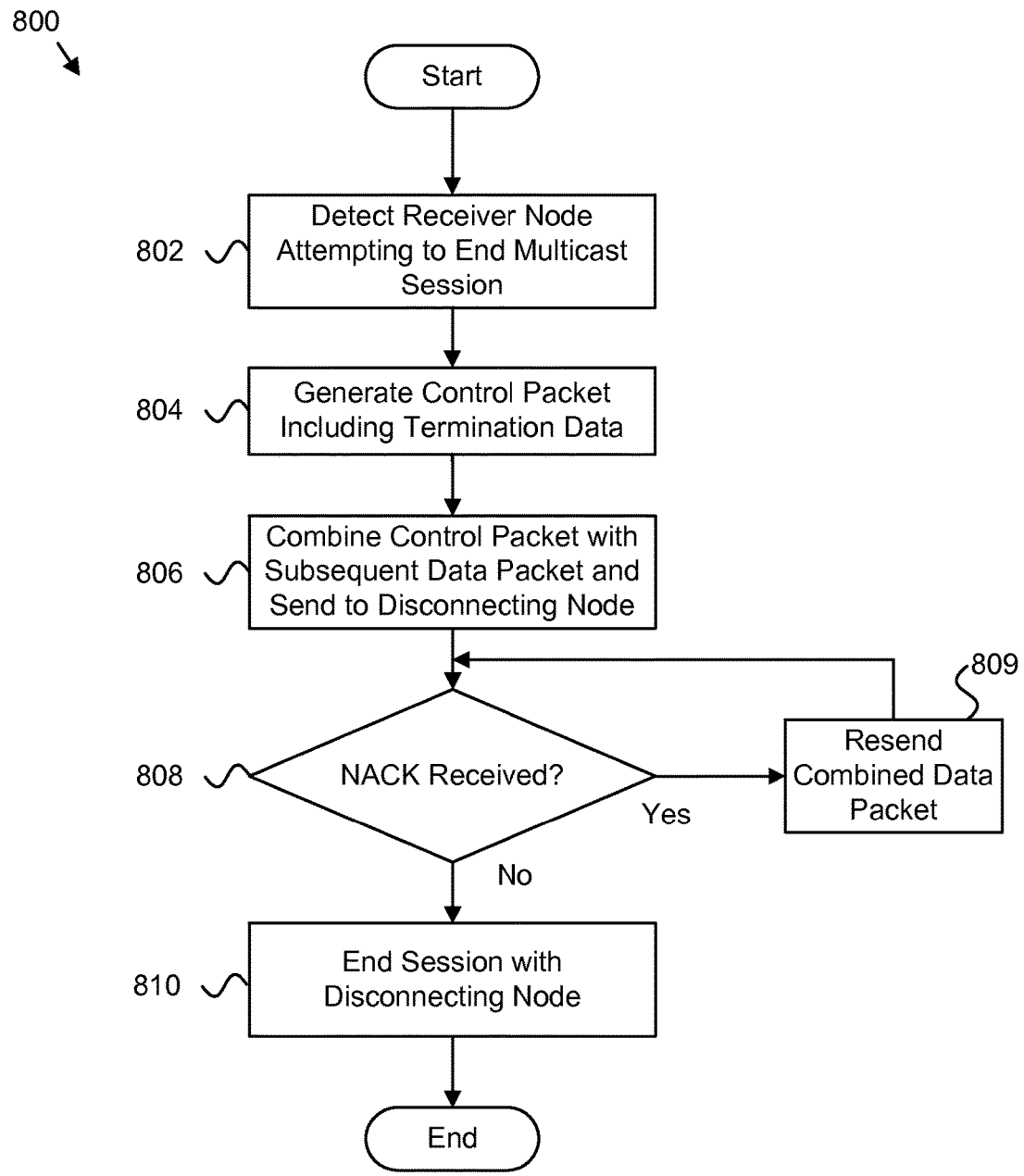
FIG. 8 is a schematic flow chart diagram illustrating one embodiment of a method for terminating a multicast networking session.

FIG. 8 depicts one embodiment of a method 800 for terminating a multicast networking session. In one embodiment, the method 800 begins and detects 802 that a receiver node is attempting to end its connection to the multicast networking session. In one example, the termination module 308 detects 802 that a receiver node is attempting to end its connection to the multicast networking session. In response to detecting the disconnecting node, the method 800 may generate 804 a control packet that includes a set termination bit or flag, e.g., the termination bit in the transport layer header is set to 1, and a node identifier for the disconnecting node. In one embodiment, the termination module 308 or the handshake module 204 may generate 804 a control packet. In a further embodiment, the method 800 combines 806 the control packet with a subsequent multicast data packet (e.g., in the transport layer header), and sends the combined data packet to the disconnecting node. For example, the packet module 206 may combine 806 the control packet with a subsequent multicast data packet.

In one embodiment, the method 800 determines 808 whether a negative acknowledgement ("NACK") signal has been received from the disconnecting node within a predetermined threshold (such as a predetermined period of time or a predetermined number of multicast data packets that have been sent), which may indicate a problem with the packet delivery or the like. The termination module 308 may determine 808 whether a NACK signal has been received. If the method 800 determines 808 that a NACK signal has been received, the method 800 resends 809 the combined data packet to the disconnecting node. The termination module 308 or the packet module 206 may resend 809 the combined data packet to the disconnecting node. If the method 800 determines 808 that a NACK signal has not been received within a predetermined threshold, the method 800 ends 810 the multicast networking session with the disconnecting node, and the method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a node module that detects a new node attempting to join a multicast networking session, the multicast networking session comprising one or more existing nodes that are communicatively coupled;
   a handshake module that generates a control packet in response to detecting the new node, the control packet comprising session initiation data associated with the multicast networking session, the control packet comprising at least a node identifier for the new node and a handshake bit for joining the new node to the multicast networking session; and
   a packet module that:
      holds the control packet in a queue until a subsequent multicast data packet is ready to be sent to the one or more existing nodes;
      creates a combined data packet comprising the control packet and the subsequent multicast data packet sent during the multicast networking session by inserting the control packet into a transport layer header of the multicast data packet; and
      sends the combined data packet to the one or more existing nodes and the new node,
   wherein the control packet is ignorable by the one or more existing nodes by determining that the node identifier in the transport layer does not match a node identifier for each of the one or more existing nodes, the one or more existing nodes continuing to process the multicast data packet of the combined data packet without processing the control packet such that ongoing data transmissions with the one or more existing nodes are not disturbed, and
   wherein the node module joins the new node to the multicast networking session in response to confirming that the new node received the control packet, wherein said modules comprise one or more of hardware circuits, a programmable hardware device and a processor which executes code.

2. The apparatus of claim 1, wherein the combined data packet is sent on a same multicast channel as other multicast data packets during the multicast networking session such that ongoing multicast data packet transmissions are not interrupted in response to the new node joining the multicast networking session.

3. The apparatus of claim 1, further comprising a discard module that ignores a multicast data packet received at the new node in response to the new node not being joined to the multicast networking session.

4. The apparatus of claim 1, further comprising an acknowledgement module that receives an acknowledgement message from the new node in response to the new node receiving the control packet.

5. The apparatus of claim 4, wherein the acknowledgement module is further configured to resend the combined multicast data packet in response to not receiving an acknowledgement message from the new node within a predetermined threshold.

6. The apparatus of claim 5, further comprising a node removal module that removes the new node from the multicast networking session in response to the acknowledgement module resending the combined multicast data packet a predetermined number of times.

7. The apparatus of claim 5, wherein the predetermined threshold comprises a time period that is a factor of a group round trip time, the group round trip time comprising a period of time for a multicast data packet to travel from a transmitting node to one or more receiver nodes of the multicast networking session and back to the transmitting node.

8. The apparatus of claim 1, further comprising a termination module that sets a termination bit in the control packet, the control packet being combined with a subsequent multicast data packet, the termination bit being set for a receiver node of the multicast networking session in response to the receiver node requesting to disconnect from the multicast networking session, the receiver node disconnecting from the multicast networking session in response to receiving the control packet with the termination bit set.

9. The apparatus of claim 8, wherein the termination module is further configured to resend the combined multicast data packet, with the termination bit set, to the receiver node requesting to disconnect from the multicast networking session in response to receiving a negative acknowledgement ("NACK") message from the receiver node.

10. The apparatus of claim 1, wherein the multicast networking session comprises a broadcast networking session.

11. A method comprising:
   detecting, by use of a processor, a new node attempting to join a multicast networking session, the multicast networking session comprising one or more existing nodes that are communicatively coupled;
   generating a control packet in response to detecting the new node, the control packet comprising session initiation data associated with the multicast networking session, the control packet comprising at least a node identifier for the new node and a handshake bit for joining the new node to the multicast networking session;

holding the control packet in a queue until a subsequent multicast data packet is ready to be sent to the one or more existing nodes;

creating a combined data packet comprising the control packet and the subsequent multicast data packet sent during the multicast networking session by inserting the control packet into the transport layer header of the multicast data packet; and sending the combined data packet to the one or more existing nodes and the new node, wherein the control packet is ignorable by the one or more existing nodes by determining that the node identifier in the transport layer does not match a node identifier for each of the one or more existing nodes, the one or more existing nodes continuing to process the multicast data packet of the combined data packet without processing the control packet such that ongoing data transmissions with the one or more existing nodes are not disturbed, and wherein the node module joins the new node to the multicast networking session in response to confirming that the new node received the control packet.

12. The method of claim 11, wherein the combined data packet is sent on a same multicast channel as other multicast data packets during the multicast networking session such that ongoing multicast data packet transmissions are not interrupted in response to the new node joining the multicast networking session.

13. The method of claim 11, further comprising receiving an acknowledgement message from the new node in response to the new node receiving the control packet, the combined multicast data packet being resent with a subsequent multicast data packet in response to not receiving an acknowledgement message from the new node within a predetermined threshold.

14. The method of claim 13, further comprising removing the new node from the multicast networking session in response to resending the control packet a predetermined number of times.

15. The method of claim 11, further comprising setting a termination bit in the control packet, the control packet being combined with a subsequent multicast data packet, the termination bit being set for a receiver node of the multicast networking session in response to the receiver node requesting to disconnect from the multicast networking session, the receiver node disconnecting from the multicast networking session in response to receiving the control packet with the termination bit set.

16. A program product comprising a non-transitory computer readable storage medium that stores code executable by a processor, the executable code comprising code to perform:

detecting a new node attempting to join a multicast networking session, the multicast networking session comprising one or more existing nodes that are communicatively coupled;

generating a control packet in response to detecting the new node, the control packet comprising session initiation data associated with the multicast networking session, the control packet comprising at least a node identifier for the new node and a handshake bit for joining the new node to the multicast networking session;

holding the control packet in a queue until a subsequent multicast data packet is ready to be sent to the one or more existing nodes;

creating a combined data packet comprising the control packet and the subsequent multicast data packet sent during the multicast networking session by inserting the control packet into the transport layer header of the multicast data packet; and sending the combined data packet to the one or more existing nodes and the new node, wherein the control packet is ignorable by the one or more existing nodes by determining that the node identifier in the transport layer does not match a node identifier for each of the one or more existing nodes, the one or more existing nodes continuing to process the multicast data packet of the combined data packet without processing the control packet such that ongoing data transmissions with the one or more existing nodes are not disturbed, and wherein the node module joins the new node to the multicast networking session in response to confirming that the new node received the control packet.

* * * * *